(12) United States Patent
AlGhunaimi et al.

(10) Patent No.: US 11,987,750 B2
(45) Date of Patent: May 21, 2024

(54) WATER MIXTURE FOR FRACTURING APPLICATION

(71) Applicant: Saudi Arabian Oil Company, Dhahran (SA)

(72) Inventors: Fahd Ibrahim AlGhunaimi, Dhahran (SA); Young Chul Choi, Dhahran (SA); Mustafa Ahmed Alkhowaildi, Safwa (SA); Eyad Alali, Dammam (SA); Abdullah A. Alomier, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 62 days.

(21) Appl. No.: 17/552,544

(22) Filed: Dec. 16, 2021

(65) Prior Publication Data

US 2023/0193116 A1 Jun. 22, 2023

(51) Int. Cl.
| | | |
|---|---|---|
| *C09K 8/66* | (2006.01) | |
| *C02F 1/44* | (2023.01) | |
| *C02F 101/10* | (2006.01) | |
| *C02F 101/30* | (2006.01) | |
| *C02F 103/08* | (2006.01) | |
| *E21B 43/16* | (2006.01) | |
| *E21B 43/26* | (2006.01) | |

(52) U.S. Cl.
CPC ............. *C09K 8/66* (2013.01); *C02F 1/441* (2013.01); *C02F 1/444* (2013.01); *E21B 43/16* (2013.01); *E21B 43/26* (2013.01); *C02F 2101/101* (2013.01); *C02F 2101/30* (2013.01); *C02F 2103/08* (2013.01)

(58) Field of Classification Search
CPC .... B01D 61/025; B01D 61/027; B01D 61/12; B01D 61/08; C02F 1/441; C02F 1/442; C02F 2103/08; C02F 1/444; C09K 8/58; C09K 8/588; E21B 43/20; E21B 21/06; E21B 43/162; E21B 41/005; E21B 41/0099; E21B 43/08; E21B 43/16; E21B 43/24; E21B 43/40; E21B 43/01; E21B 43/26; E21B 43/35; E21B 43/38; E21B 49/0875; E21B 43/2405; E21B 43/25; E21B 7/00

See application file for complete search history.

(56) References Cited

U.S. PATENT DOCUMENTS

| | | |
|---|---|---|
| 7,621,330 B1 | 11/2009 | Walters et al. |
| 8,658,574 B2 | 2/2014 | Li et al. |
| 10,550,316 B2 | 2/2020 | McEwen et al. |

(Continued)

FOREIGN PATENT DOCUMENTS

AU 2017298020 A1 * 3/2019 ............. B01D 61/18

OTHER PUBLICATIONS

Al-Ghouti et al., "Produced water characteristics, treatment and reuse: A review," Journal of Water Process Engineering, 2019, 28:222-239, 18 pages.

(Continued)

*Primary Examiner* — Zakiya W Bates
(74) *Attorney, Agent, or Firm* — Fish & Richardson P.C.

(57) ABSTRACT

A method for using produced water (PW), for example, for use in a fracturing fluid. The method includes performing ultrafiltration on the PW to form filtered PW, filtering seawater (SW) to form filtered SW, and blending the filtered PW with the filtered SW to form an aqueous blend.

19 Claims, 5 Drawing Sheets

(56) References Cited

U.S. PATENT DOCUMENTS

| | | | |
|---|---|---|---|
| 10,563,119 B2 | 2/2020 | Li et al. | |
| 2008/0287323 A1 | 11/2008 | Li et al. | |
| 2013/0161256 A1* | 6/2013 | Henthorne | B01D 63/12 210/651 |
| 2015/0107841 A1* | 4/2015 | Suijkerbuijk | E21B 43/162 166/305.1 |
| 2021/0230017 A1* | 7/2021 | Crouch | B01D 61/12 |
| 2022/0243120 A1* | 8/2022 | Birkle | C02F 9/00 |
| 2023/0203917 A1* | 6/2023 | Pinchin | C02F 1/444 210/747.1 |

OTHER PUBLICATIONS

Al-Samhan et al., "Evaluating scale deposition and scale tendency of effluent water mix with seawater for compatible injection water," Journal of Petroleum Exploration and Production Technology, Mar. 2020, 10:2105-2111, 7 pages.

Bader, "Sulfate removal technologies for oil fields seawater injection operations," J. of Petroleum Science and Engineering, Jan. 2007, 55:93-110, 18 pages.

Basu et al., "Addressing the challenges of sourcing water for hydraulic fracturing by the use of membrane technologies," presented at the Abu Dhabi International Petroleum Exhibition and Conference, Nov. 2015, 12 pages.

Feder, "Water, water everywhere: Using ML and game theory to win at produced-water forecasting," Journal of Petroleum Technology, Aug. 31, 2020, retrieved on Oct. 28, 2021 from URL <https://jpt.spe.org/water-water-everywhere-using-ml-and-game-theory-win-produced-water-forecasting>, 13 pages.

https://jpt.spe.org [online], "Produced water treatment: yesterday, today, and tomorrow a holistic approach," Jan. 2012, retrieved Oct. 28, 2021 from URL <https://jpt.spe.org/produced-water-treatment-yesterday-today-and-tomorrow>, 9 pages.

Li et al., "A review of crosslinked fracturing fluids prepared with produced water," Petroleum, 2016, 2:313-323, 11 pages.

Li et al., "High-TDS produced water based, low-damaging fracturing fluids for applications at 300oF or higher," SPE Annual Technical Conference and Exhibition, Sep. 2018, 13 pages.

Puntervold et al., "Injection of Seawater and Mixtures with Produced Water into North Sea Chalk Formation: Impact on Wettability, Scale Formation, and Rock Mechanics Caused by Fluid-Rock Interaction," SPE/EAGE Reservoir Characterization and Simulation Conference, Oct. 2007, 12 pages.

Tavare, "Mixing, reaction and precipitation: The barium sulphate precipitation system," Mixing and Crystallization, 2000, 191-203, 2 pages.

www.prnewswire.com [online], "Global produced water treatment market is expected to reach $13.24 billion by 2027," Stratistics Market Research Consulting, Aug. 2020, retrieved Oct. 18, 2021 from URL <https://www.prnewswire.com/news-releases/global-produced-water-treatment-market-is-expected-to-reach--13-24-billion-by-2027--301106560.html>, 6 pages.

* cited by examiner

WATER MIXTURE FOR FRACTURING APPLICATION

TECHNICAL FIELD

The present disclosure is directed to the reuse of produced water from hydrocarbon reservoirs. Specifically, the produced water is used in a blend to form a base fluid for fracturing.

BACKGROUND

As reservoirs age, the production of wastewater increases. While the wastewater can be separated from the produced hydrocarbons, it is often too contaminated with salts and organics to be reused or economically treated.

The US Department of Energy's Argonne National Laboratory estimates the volume of produced water in the United States at 21 billion barrels (bbl) a year. Although estimates of produced water volumes vary, the quantity will continue to increase globally. Specifically, as an oil field matures, oil production decreases while water production increases. The current water/oil ratio is estimated at 2:1 to 3:1 worldwide, converting to a water cut of 50% to 75% of the total amount of produced fluids.

As an example, the first commercial oil production from the Williston Basin in the US began in 1951 and first production from the Bakken formation in the Williston basin started in 1953. Approximately 450 million bbl of oil were produced from the Bakken and Three Forks formations between 2008 and 2013. From 2012 through mid-2019, the average 90-day cumulative water production from Bakken and Three Forks wells increased nearly 400%, for example, to about 110,000 bbl of water over a 90-day period in 2019 compared to about 75,000 bbl of water.

In some cases, the wastewater is pumped back into the reservoir or into a wastewater well. Determining ways to economically treat or reuse the produced water is the subject of numerous studies.

SUMMARY

An embodiment described in examples herein provides a method for using produced water (PW). The method includes performing ultrafiltration on the PW to form filtered PW, filtering seawater (SW) to form filtered SW, and blending the filtered PW with the filtered SW to form an aqueous blend.

DETAILED DESCRIPTION

Embodiments described in examples herein provides a method for the treatment and reuse of produced water. As used herein, produced water (PW) refers to the associated and non-associated water present in a reservoir that reaches the surface when producing hydrocarbons. In the method described herein, after separation of bulk hydrocarbons, the PW is treated by ultrafiltration to remove any residual hydrocarbons. The method blends the treated PW with seawater (SW) that has been treated by nanofiltration to produce a fluid suitable for activities in oil and gas Industry, for example, for fracturing or other stimulation activities in production. The ratios of the treated PW and treated SW streams can be adjusted to control the ionic concentrations to be compatible with specific applications.

By using membrane technology for the treatment of the PW and SW, the PW and SW can be blended to make a suitable mixture for a base fluid for hydraulic fracturing of tight oil and gas reservoirs, for example, in unconventional (shale) hydrocarbon production. Further, the blends may be used as injection fluids for enhanced oil recovery (EOR) in conventional reservoirs.

Figure 1:
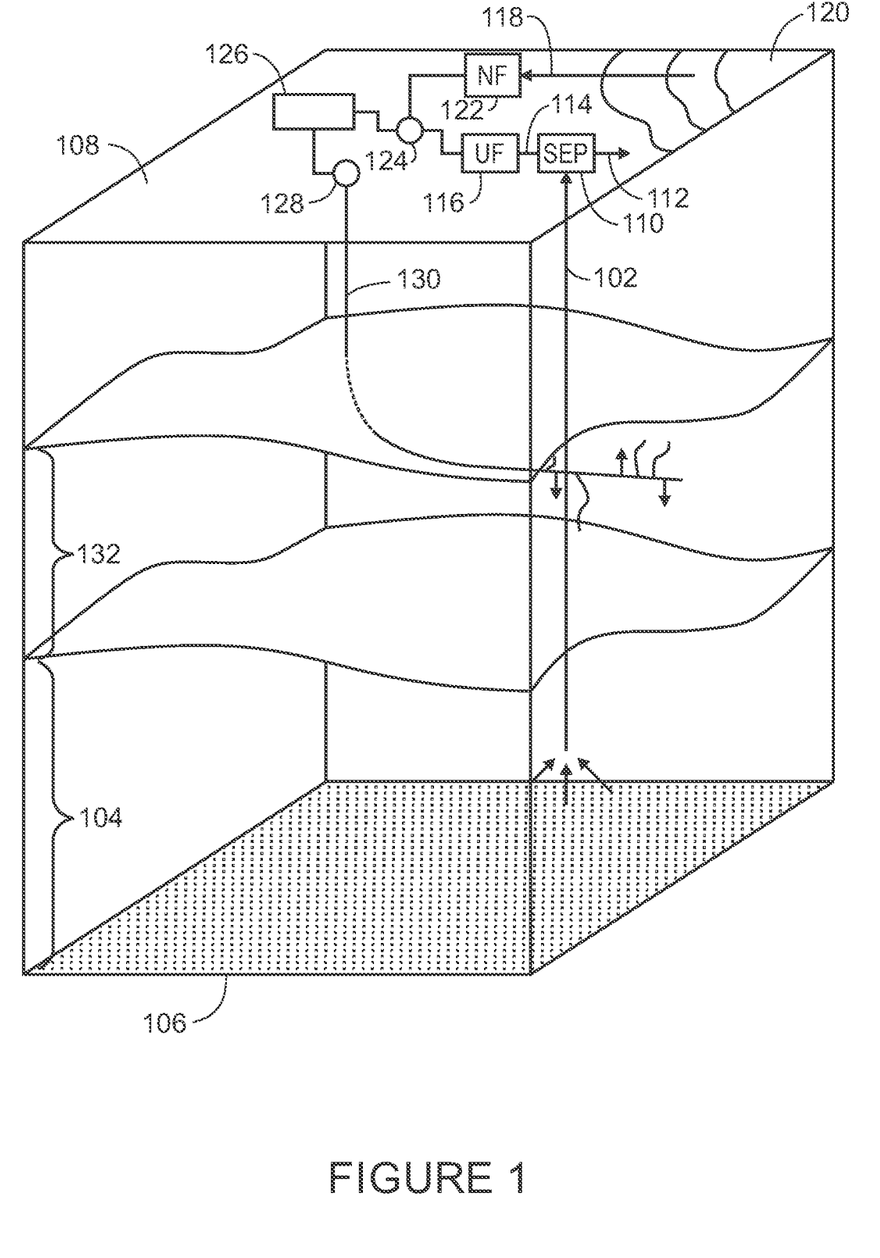
FIG. 1 is a schematic diagram of the use of a blend of treated produced water and treated seawater in a fracturing operation.

FIG. 1 is a schematic diagram of the use of a blend of treated produced water and treated seawater in a fracturing operation. As described herein, fluids produced through a production well 102 in a reservoir layer 104 will slowly increase in water content (water cut) as the hydrocarbons are removed. For example, water from an aquifer layer 106 may be drawn into the production well 102 with the hydrocarbons. At the surface 108, the hydrocarbons may be separated from the produced fluids in a separation unit 110, for example, including a settling tank, a flash tank, or the like. This creates a stream of de-oiled production water (PW) 114 for disposal.

In various embodiments described herein, the PW 114 is treated in an ultrafiltration unit 116 using a microfiltration (MF) membrane or ultrafiltration (UF) membrane to remove any remaining oil droplets that are not removed by the separation unit 110. Typically, MF and UF membranes are made from an organic material, such as polyether sulfone (PES) or polyvinylidene fluoride (PVDF), but these materials would not be compatible with contaminants found in the PW 114. Accordingly, the material for the MF membrane or the UF membrane can be a ceramic, which is compatible with high temperature, $H_2S$, and the organics in the PW 114. The use of ceramic membranes would allow for the separation without significant pretreatment processes and cooling systems.

The ionic content of the PW 114 is generally too high for use in fracturing fluids. To overcome this, seawater (SW) 118, for example, drawn in from the sea 120, is processed in a nanofiltration unit 122. The nanofiltration unit 122 uses a nanofiltration (NF) membrane to remove organic materials and divalent ions from the SW 118. For example, the concentration of sulfate ions in the in the SW 118 is lowered in the nanofiltration unit 122 to enhance compatibility with fracturing fluids and other oilfield uses. In some embodiments, reverse osmosis (RO) membranes are used in the nanofiltration unit 122, although the use of RO membranes increases energy costs. In one embodiment, the NF membrane is a Dow-DuPont Filmtech NF270.

The treated water streams from the ultrafiltration unit 116 and the nanofiltration unit 122 can be combined 124 and sent to mixing units 126 to be used as a base fluid for a fracturing fluid. The fracturing fluid from the mixing units 126 can be pumped 128 into a fracturing well 130 to create fractures in a shale reservoir 132. In some embodiments, the treated water streams are combined 124 and reinjected into the reservoir layer 104 for enhanced oil recovery.

Figure 2:
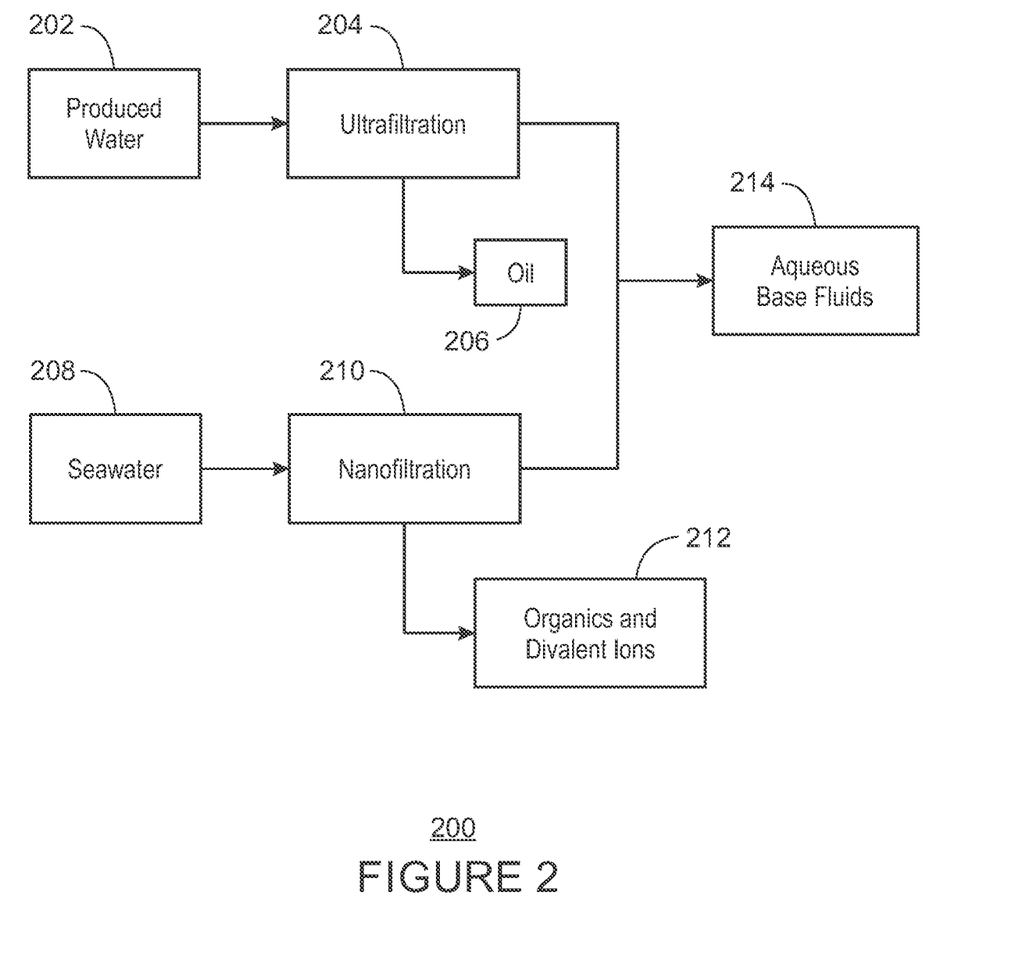
FIG. 2 is a schematic diagram providing an overview of the process.

FIG. 2 is a schematic diagram providing an overview 200 of the process. As described herein, after de-oiling, the PW 202 is treated by ultrafiltration 204 to remove remaining droplets of oil 206. The SW 208 is treated by nanofiltration (NF) 210 to remove organic materials and divalent ions 212.

The treated PW and SW streams are then mixed to form the aqueous base fluid 214. The blending provides better water quality than the direct use of PW or SW, for example, with total dissolved solids (TDS) of less than about 50,000 ppm, and calcium ion content of less than about 2000 ppm. In some embodiments, the aqueous base fluid 214 has substantially no sulfate ions, calcium ions, or oil content. In various embodiments, the method is used for in-situ treatment of flow-back water from a hydraulic fracturing operation to be recycled and utilized for further fracturing. In some embodiments, blending the nonfiltered SW with PW is used to reduce the salinity and oil contaminants and avoid the requirements of multiple treatment approaches.

Figure 3:
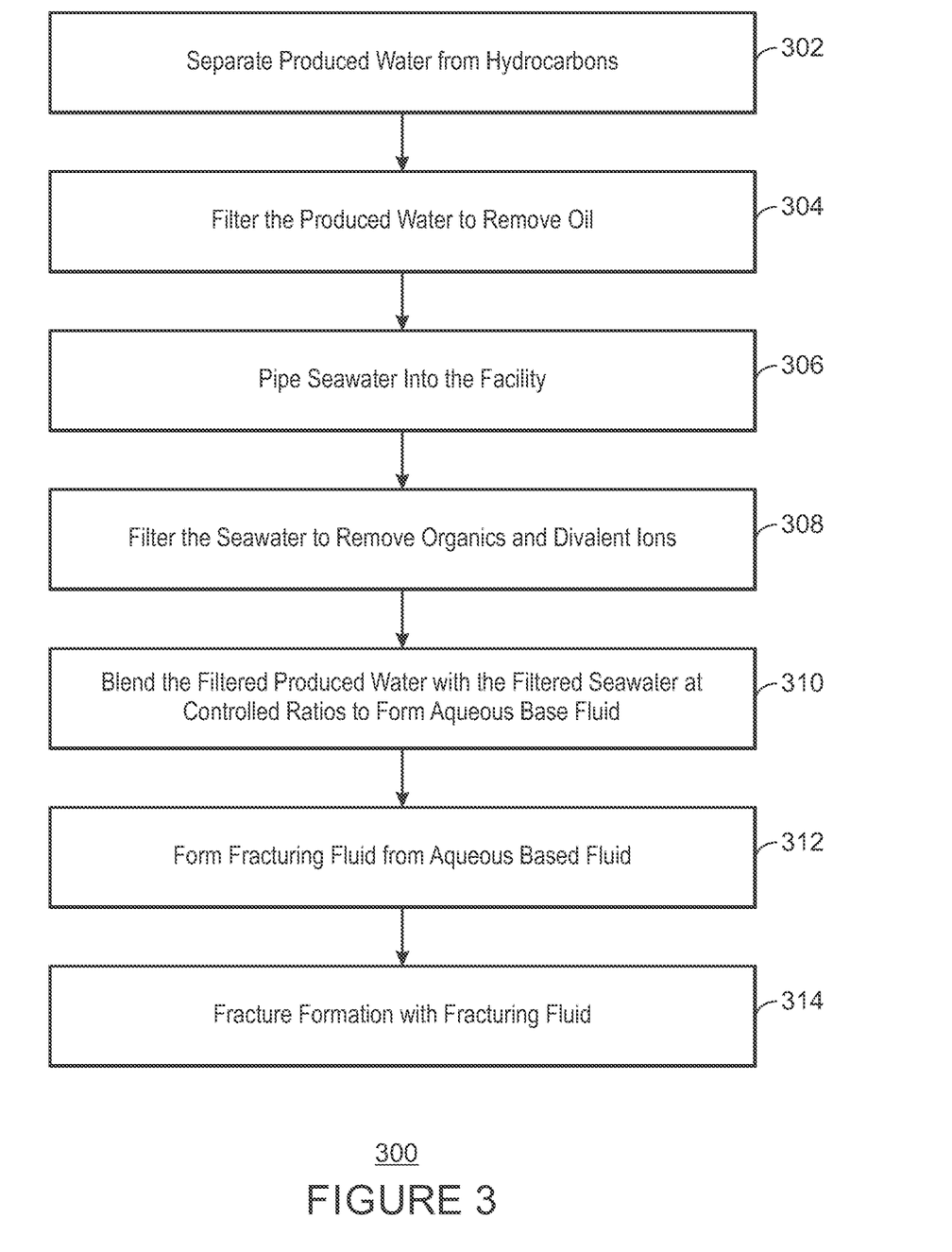
FIG. 3 is a process flow diagram of a method for using a blend of treated produced water and treated seawater as a base fluid for fracturing.

FIG. 3 is a process flow diagram of a method 300 for using a blend of treated produced water and treated seawater as a base fluid for fracturing. The method begins at block 302 with the separation of produced water from production fluids taken from a reservoir.

At block 304, the produced water is filtered to remove any residual oil. As described herein, in various embodiments, this is performed by ultrafiltration using a ceramic membrane.

At block 306, seawater is piped into the facility. For example, water intakes may be positioned off the coast near the facility to pull in the seawater.

At block 308, the seawater is filtered to remove organic compounds and divalent ions. As described herein, in various embodiments, this is performed by nanofiltration. In some embodiments, a nanofiltration membrane is used for the separation. In some embodiments, a reverse osmosis membrane is used for the separation.

At block 310, the filtered PW is blended with the filtered SW. The ratio of the filtered PW to the filtered SW is adjusted to control the ionic strength of the blend. In some embodiments, this is used to form an aqueous base fluid for a fracturing fluid. In some embodiments, the blend is directly injected into a reservoir for enhanced oil recovery.

At block 312, a fracturing fluid is formed using the aqueous base fluid. In various embodiments, this is performed by blending a viscosity-enhancing polymer into the aqueous base fluid to form the fracturing fluid. Viscosity-enhancing polymer include polysaccharides, such as guar gum, guar gum derivatives, carboxymethyl hydropropyl guar gum, and the like. A cross-linker may be added to the fracturing fluid to increase the viscosity and, thus, the capacity to support solids such as proppants. In some embodiments, the cross-linking agent is an ion containing a metal, such as zirconium, aluminum, borate, and the like. Proppants may then be blended into the fracturing fluid. If used, the proppants may include sand, a synthetic mesh of sands, and any other materials known to function as proppants in fracturing, such as ceramics, crushed nut shells, and the like.

At block 314, the fracturing fluid is then injected into the formation at high pressure to form fractures, for example, in a shale layer, and push the proppants into the fractures to hold them open. This allows the production of hydrocarbons through the fractures.

Examples

Treatment and Blending of PW and SW

The procedure was tested by simulating estimate ionic concentrations in seawater and produced water using the software package discussed below. The concentrations were used to determine ratios for mixing, as discussed further with respect to FIG. 4. The filtration apparatus used for testing can be any type of commercial units known in the art, for example, lab scale units available from MMS AG of Silkeborg, Denmark.

Figure 4:
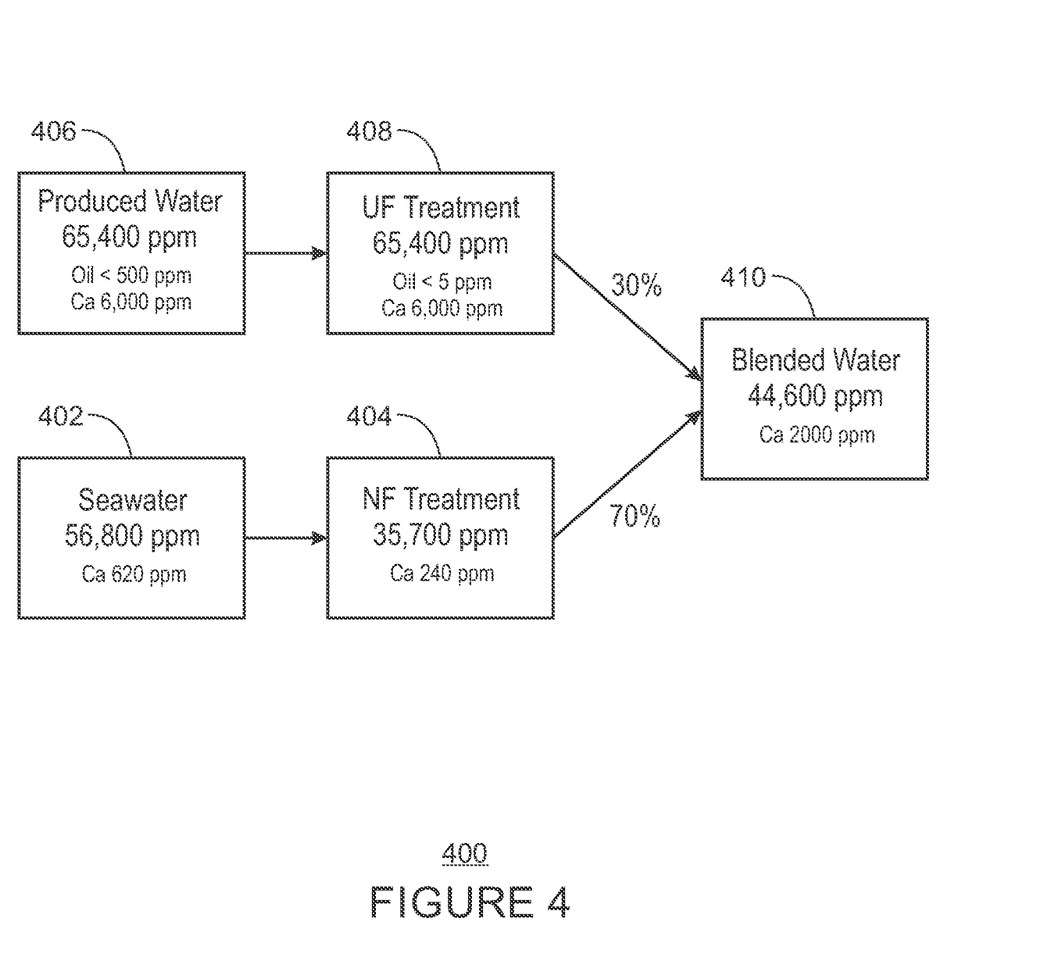
FIG. 4 is a block diagram showing an example of ionic concentrations before and after treatment and for blends.

FIG. 4 is a block diagram showing an example 400 of ionic concentrations before and after treatment and for blends. The SW 402 used was from the Arabian Gulf, and was sampled off the Saudi Arabian coast. Table 1 shows the typical ionic composition of the Arabian Gulf seawater. The concentration of each solute may vary slightly depending on the sampling location. This data was used to estimate the composition to be used for testing, shown in Table 2.

As shown in Table 1, the SW 402 had a TDS value of about 56,800 mg/L and a calcium ion concentration of about 620 ppm. The mg/L concentration is assumed to approximate ppm herein, as the solution density is about 1.0568 g/mL. As shown in block 404, after nanofiltration, the total dissolved solids in the seawater will be reduced to about 35,700 ppm and the calcium ion concentration will be reduced to about 240 ppm.

The purpose of treatment of the PW 406 is to remove particles, color, and organics. The concentration of dissolved ions in the PW 406 was not significantly changed by the ultrafiltration, as shown in block 408. As the PW 406 generally has lower sulfate concentration, compared to the SW 402, a significant reduction of dissolved species is not targeted. Thus, the ultrafiltration of the PW 406 will lower the oil content from less than about 500 ppm to less than about 5 ppm without changing the ionic concentration.

TABLE 1

Ionic composition of Arabian Gulf Seawater

| Solute | Concentration |
| --- | --- |
| Boron | <1 mg/L |
| Barium | <1 mg/L |
| Calcium | 618 mg/L |
| Iron | <1 mg/L |
| Magnesium | 2,108 mg/L |
| Potassium | 595 mg/L |
| Silicon | <1 mg/L |
| Sodium | 18,451 mg/L |
| Strontium | 11 mg/L |
| Chloride | 30,694 mg/L |
| Sulfate | 4,142 mg/L |
| Carbonate | <1 mg/L |
| Bicarbonate | <150 mg/L |
| Total Dissolved Solids | 56,800 mg/L |

After treating the PW with UF and SW with NF can be blended at a ratio of 30% PW and 70% SW to achieve a final concentration of about 44,600 ppm TDS in the blended water 410. The ratio can be adjusted to control the ionic concentrations in the blended water 410. In this example, the target was chosen was to satisfy calcium concentration less than 2,000 ppm and sulfate concentration less than 200 ppm simultaneously. For the purpose of general fracking, Ca less than 5,000 ppm and sulfate less than 1,000 ppm can be used as targets for determining the blending ratio.

Table 2 shows an example of the ionic compositions of the PW 406 and the SW 402 after nanofiltration at block 404. As shown, the blending ratio achieves 2000 ppm or lower calcium concentration in the final water. The results of the SW treated with NF was obtained using a software package called Reverse Osmosis System Analysis (ROSA), available from FilmTec Corp. (a subsidiary of Dow Chemical). Depending on the final usage of the blended water, the blending ratio can be modified to generate the desired concentration of particular ion. The membranes tested include nanofiltration and ultrafiltration membranes and cartridges available from FilmTec.

TABLE 2

Compositions of produced water and seawater simulated in our experiments

|    | PW (30%) | SW1 treated with NF (70%) | Final (44600 ppm TDS) |
|----|----------|---------------------------|------------------------|
| K  | 1500     | 390                       | 720                    |
| Na | 18000    | 12300                     | 1400                   |
| Mg | 620      | 760                       | 180                    |
| Ca | 6000     | 240                       | 1970                   |
| Cl | 39900    | 21900                     | 27300                  |
| SO4| 110      | 89                        | 95                     |

The result of the techniques described is the high flexibility of the method to deliver water for hydraulic fracturing at varying flowrates and pressure to meet the needs of fracturing operations. As described herein, the blend can be used for water flooding in EOR applications. Using similar methods, blends of treated PW and SW can be made in different ratios to make desirable water properties for specific applications.

Rheology Measurements for Proposed Ionic Concentrations

The effect of the ionic concentrations on rheological properties was tested using a synthesized water blend. The standard performance requirement for fracturing fluids is to maintain a viscosity of 200 cP over the period of fracturing operation, which is usually around 2 hours.

The synthesized water was prepared in the laboratory to formulate a 44,000 ppm TDS with 2,200 hardness ($Ca^{2+}$/$Mg^{2+}$) water mix, Table 3 summarizes the salts used with their respective quantity.

TABLE 3

Compositions of produced water and seawater tested

| Salts:          | Amount (g/L) |
|-----------------|--------------|
| NaCl            | 36.67        |
| $CaCl_2 \cdot 2H_2O$  | 7.34         |
| $MgCl_2 \cdot 6H_2O$  | 1.67         |
| KCl             | 1.33         |

Figure 5:
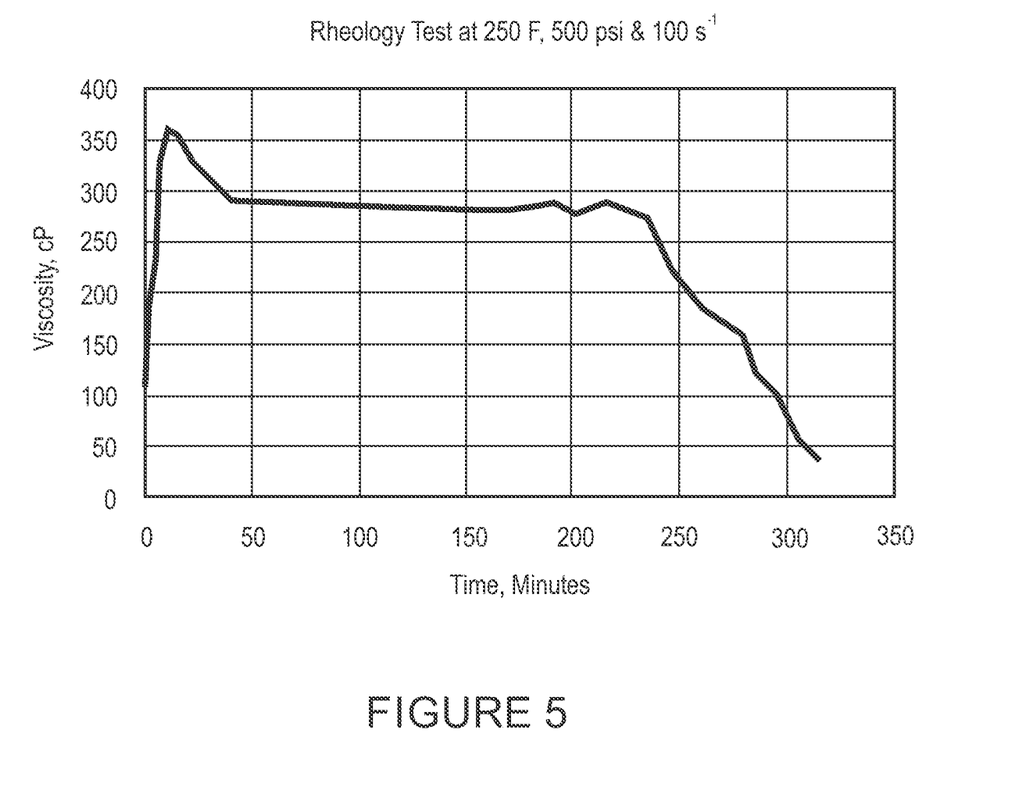
FIG. 5 is a plot of the rheological results showing that the fluid maintains a stable viscosity for over two hours at the given conditions.

FIG. 5 is a plot of the rheological results showing that the fluid maintains a stable viscosity for over two hours at the given conditions. The Chandler apparatus was used to assess the rheological properties of the fluid system at high temperature, high pressure conditions. The Chandler apparatus is a viscometer that measures a fluid's apparent viscosity at a given experimental conditions, for example, shear rate, temperature, and pressure. The apparatus is comprised of a concentric cylinder viscometer that uses rotor and bob geometry that are widely adapted and accepted by the oil and gas industry. The experimental parameters: 250 F temperature, 500 psi pressure, 100 $s^{-1}$ shear rate and 5.5 hours running time. The polymer used was carboxymethyl hydroxypropyl guar gum (CMHPG). The concentration of the polymer was 45 lb/1000 gal (an industry standard polymer loading), and the concentration of the crosslinker was 1.0 gallon per 1000 gal. The mixing time allowed was 10-15 minutes prior to using the rheometer apparatus under the following conditions: 250 F temperature, 500 psi pressure, 100 s−1 shear rate and 5.5 hours running time.

The synthesized water mix was used as base water for preparing fracturing fluids conventionally using chemical additives that are used in the field. The viscosity values showed that the water base could be used in fracturing operations as it sustained a stabilized viscosity over 200 cP under more than a 120 minutes time-period. The stabilized viscosity values indicate that the fluid system can be applied in fracturing operations, for having high enough viscosity to open up fractures, carry proppant, such as sand, into the fractures, and limit fluid leak off downhole.

Embodiments

An embodiment described in examples herein provides a method for using produced water (PW). The method includes performing ultrafiltration on the PW to form filtered PW, filtering seawater (SW) to form filtered SW, and blending the filtered PW with the filtered SW to form an aqueous blend.

In an aspect, the method includes passing the PW across a ceramic ultrafiltration membrane. In an aspect, the method includes, removing particles, organics, and color bodies from the PW to form the filtered PW. In an aspect, the method includes removing oil droplets from the PW to form the filtered PW.

In an aspect, the method includes performing nanofiltration of the SW to form the filtered SW.

In an aspect, the method includes performing reverse osmosis of the SW to form the filtered SW. In an aspect, the method includes removing divalent ions from the SW to form the filtered SW. In an aspect, the method includes removing organic compounds from the SW to form the filtered SW. In an aspect, the method includes removing sulfate ions from the SW to form the filtered SW.

In an aspect, the method includes separating the PW from hydrocarbons before filtering the PW. In an aspect, the method includes controlling a ratio of the filtered PW to the filtered SW to adjust the ionic concentration of the aqueous blend. In an aspect, the method includes controlling the ratio of the filtered PW to the filtered SW at 30/70.

In an aspect, the method includes using the aqueous blend to form a fracturing fluid. In an aspect, the method includes fracturing a formation with the fracturing fluid. In an aspect, the method includes injecting the aqueous blend into a reservoir for enhanced oil recovery.

In an aspect, the method includes reducing total dissolved solids (TDS) in the SW from about 57,000 ppm to about 36,000 ppm. In an aspect, the method includes adjusting a ratio of the filtered PW to the filtered SW to form an aqueous blend with a TDS content of less than 50,000 ppm. In an aspect, the method includes adjusting a ratio of the filtered PW to the filtered SW to form an aqueous blend with a calcium ion content of less than 2000 ppm.

In an aspect, the method includes forming a fracturing fluid from the aqueous blend that maintains a viscosity of greater than 200 centipoise at 100 $s^{-1}$ for greater than 200 minutes at a temperature of 250° C. and a pressure of 500 psi. In an aspect, the method includes pumping the seawater from the ocean.

Other implementations are also within the scope of the following claims.

What is claimed is:

1. A method for using produced water (PW), comprising:
performing ultrafiltration on the PW to form filtered PW;
filtering seawater (SW) to form filtered SW, wherein the filtering of the seawater is not performed by reverse osmosis; and
blending the filtered PW with the filtered SW at a controlled ratio of the filtered PW to the filtered SW to form an aqueous blend suitable for use in forming a fracturing fluid, wherein the controlled ratio corresponds to a ratio that is controlled based on an ionic concentration of the aqueous blend.

2. The method of claim 1, comprising passing the PW across a ceramic ultrafiltration membrane.

3. The method of claim 1, comprising removing particles, organics, and color bodies from the PW to form the filtered PW.

4. The method of claim 1, comprising removing oil droplets from the PW to form the filtered PW.

5. The method of claim 1, comprising performing nanofiltration of the SW to form the filtered SW.

6. The method of claim 1, comprising removing divalent ions from the SW to form the filtered SW.

7. The method of claim 1, comprising removing organic compounds from the SW to form the filtered SW.

8. The method of claim 1, comprising removing sulfate ions from the SW to form the filtered SW.

9. The method of claim 1, comprising separating the PW from hydrocarbons before filtering the PW.

10. The method of claim 1, comprising controlling the ratio of the filtered PW to the filtered SW to adjust the ionic concentration of the aqueous blend.

11. The method of claim 10, comprising controlling the ratio of the filtered PW to the filtered SW at 30/70.

12. The method of claim 1, comprising using the aqueous blend to form the fracturing fluid.

13. The method of claim 12, comprising fracturing a formation with the fracturing fluid.

14. The method of claim 1, comprising injecting the aqueous blend into a reservoir for enhanced oil recovery.

15. The method of claim 1, comprising reducing total dissolved solids (TDS) in the SW from about 57,000 ppm to about 36,000 ppm.

16. The method of claim 1, comprising adjusting a ratio of the filtered PW to the filtered SW to form an aqueous blend with a total dissolved solids (TDS) content of less than 50,000 ppm.

17. The method of claim 1, comprising adjusting a ratio of the filtered PW to the filtered SW to form an aqueous blend with a calcium ion content of less than 2000 ppm.

18. The method of claim 1, comprising forming the fracturing fluid from the aqueous blend that maintains a viscosity of greater than 200 centipoise at $100 \text{ s}^{-1}$ for greater than 200 minutes at a temperature of 250° C. and a pressure of 500 psi.

19. The method of claim 1, comprising pumping the seawater from an ocean.

* * * * *